United States Patent
Sala

(10) Patent No.: US 9,950,769 B2
(45) Date of Patent: Apr. 24, 2018

(54) ELECTRIC FRONT DERAILLEUR

(71) Applicant: TIEN HSIN INDUSTRIES CO., LTD., Taichung (TW)

(72) Inventor: Alfredo Sala, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 203 days.

(21) Appl. No.: 15/160,361

(22) Filed: May 20, 2016

(65) Prior Publication Data

US 2017/0334519 A1 Nov. 23, 2017

(51) Int. Cl.
*B62M 9/132* (2010.01)
*B62M 25/08* (2006.01)

(52) U.S. Cl.
CPC ............ *B62M 9/132* (2013.01); *B62M 25/08* (2013.01)

(58) Field of Classification Search
CPC .............................. B62M 9/132; B62M 25/08
USPC .......................................................... 474/80
See application file for complete search history.

(56) References Cited

U.S. PATENT DOCUMENTS

| | | | | |
|---|---|---|---|---|
| 6,623,389 B1* | 9/2003 | Campagnolo | .......... | B62M 9/122 474/70 |
| 6,648,782 B2 | 11/2003 | Valle | | |
| 2005/0189158 A1* | 9/2005 | Ichida | .................... | B62M 9/132 180/260 |
| 2005/0205323 A1* | 9/2005 | Ichida | .................... | B62M 9/132 474/80 |
| 2005/0266945 A1* | 12/2005 | Meggiolan | ............. | B62M 9/132 474/70 |
| 2005/0277503 A1* | 12/2005 | Ichida | .................... | B62K 23/06 474/80 |
| 2006/0189422 A1* | 8/2006 | Ichida | .................... | B62M 9/132 474/80 |
| 2007/0037645 A1* | 2/2007 | Ishikawa | ................ | B62M 9/132 474/80 |
| 2007/0184925 A1* | 8/2007 | Ichida | .................... | B62M 9/132 474/80 |
| 2012/0149509 A1* | 6/2012 | Capogna | ................ | B62M 9/122 474/80 |
| 2016/0152303 A1* | 6/2016 | Bortoli | .................. | B62M 25/08 701/51 |

* cited by examiner

*Primary Examiner* — William E Dondero
*Assistant Examiner* — Robert T Reese
(74) *Attorney, Agent, or Firm* — WPAT, PC

(57) ABSTRACT

An electric front derailleur, comprising: a support member, disposed on a frame of a bicycle and having a first mounting portion and a second mounting portion; a driving unit, disposed in the first mounting portion and configured to drive a worm gear to rotate; a first transmission unit, having at least one transmission gear that is driven by the worm gear; a second transmission unit, comprising a rack, a linking member, and a swing member, wherein the rack is engaged with the transmission gear and movably disposed in the second mounting portion, and the linking member has one end pivoted to the rack and the other end pivoted to the swing member; a chain guide, comprising a pivot portion, and a chain guiding portion, wherein the pivot portion are pivoted to the swing member, and the chain guiding portion is configured to move a chain.

10 Claims, 9 Drawing Sheets

ELECTRIC FRONT DERAILLEUR

BACKGROUND OF THE INVENTION

Technical Field

The present disclosure involves a front derailleur of a bicycle, and more particularly an electric front derailleur that can prevent a stuck or inaccurate shift of derailleur from occurring when a chain guide is subject to an impact and a force is being transmitted back to a transmission mechanism, causing deformation and dislocation of the transmission mechanism.

Description of the Related Art

A front derailleur of a bicycle is mounted on a frame tube of the bicycle, and during a gear shift operation, a chain of the bicycle is moved to a target sprocket wheel by the front derailleur, so as to achieve the purpose of changing gears, which is a very common configuration of current bicycles. Particularly, electric derailleurs have been gradually replacing traditional derailleurs of which the cables are controlled manually.

For a conventional front derailleur, see U.S. Pat. No. 6,648,782 B2, "Actuating Apparatus for A Bicycle Derailleur, with Coupling Connected to the Driven Shaft". As shown in FIG. 1, the device comprises a fixed support body 2, an annular clamp 3, a front fork unit 5, a hook-shaped swing arm 6, and a linking member 6a. The fixed support body 2 surrounds a tube 4 of the bicycle through the annular clamp 3 and is fixed on the tube 4 of the bicycle with a bolt inserted through two ends of the clamp 3. A stud shaft 10 is inserted through and connects the swing arm 6 and a center position of the fixed support body 2 such that the swing arm 6 is pivoted onto the fixed support body 2. A lower end of the swing arm 6 is pivoted to the front fork unit 5 through another stud shaft 11. The front fork unit 5 is a U-shaped groove with its opening facing down for a chain to pass through. An arc-shaped worm gear 31 is disposed at the other end of the swing arm 6. The worm gear 31 is engaged with a worm gear 29. A lower portion of the worm gear 29 is connected to an electric actuating device 12. The front fork unit 5 has a pair of first contact portions towards the actuating device 12. The first contact portions are pivoted to a lower end of the linking member 6a through a stud shaft 9. An upper end of the linking member 6a is pivoted to the fixed support body 2 through a stud shaft 8.

During operation, the actuating device 12 drives the worm gear 29 to rotate through electric power, and the worm gear 29 is engaged with the worm gear 31 and can lead the worm gear 31 to rotate about the stud shaft 10, such that the front fork unit 5 pivoted to the lower end of the swing arm 6 can move to be close to or away from the frame tube 4 of the bicycle, to lead a chain to move to a target sprocket wheel A or sprocket wheel B, thereby achieving the purpose of changing gears.

However, during a ride on a road and particularly in the mountainous area or suburbs, it is difficult for the bicycle to avoid an uneven road and thus bounce, and the front fork unit 5, the swing arm 6, and the linking member 6a are all possibly impacted by hard objects, causing the swing arm 6 to be dislocated, and thus the worm gear 29 is tightly stuck by the worm gear 31, making the actuating device 12 unable to drive the worm gear 29 to rotate freely and thus become damaged, thereby causing the problem of a stuck failure or inaccurate transmission during a gear shift operation.

SUMMARY OF THE INVENTION

The main objective of the present disclosure is to provide an electric front derailleur, which can prevent the problem of a stuck failure or inaccuracy from occurring during a gear shift when the bicycle is subject to an impact or vibration during a ride.

In order to achieve the above objective, the present disclosure provides an electric front derailleur comprises: a support member, disposed on a frame of a bicycle and having a first mounting portion and a second mounting portion; a driving unit, disposed in the first mounting portion and configured to drive a worm gear to rotate; a first transmission unit, having at least one transmission gear, and driven by the worm gear to drive the transmission gear to rotate; a second transmission unit, comprising a rack, a linking member, and a swing member, wherein the rack is engaged with the transmission gear and movably disposed in the second mounting portion, and the linking member has one end pivoted to the rack and the other end pivoted to the swing member; and a chain guide, having a first pivot portion, a second pivot portion, and a chain guiding portion, having a first pivot portion and a second pivot portion pivoted to the swing member, and a chain guiding portion configured to guide a chain to move.

Wherein the swing member has a first gear shaft, a second gear shaft, a middle gear, a first side wall, and a second side wall, wherein the first gear shaft is fixedly disposed in the support member and the body of the first gear shaft is disposed with a plurality of first teeth for engaging with the middle gear, the first side wall is disposed with a third jointing end and a fourth jointing end, the second side wall is disposed with a first jointing end and a second jointing end, the second jointing end is disposed with a connecting portion connected to the fourth jointing end of the first side wall, and the second gear shaft has two ends fixedly disposed in the first side wall and the second side wall respectively and the body of the second gear shaft is disposed with a plurality of second teeth for engaging with the middle gear.

Wherein the first transmission unit is disposed in an accommodating space of the first mounting portion, wherein an opening of the accommodating space is closed by a cover member.

The first transmission unit is disposed with a first gear member, a second gear member, and a fifth gear, wherein the first gear member is engaged with the worm gear and works with the second gear member, the second gear member works with the fifth gear, the first gear member, the second gear member, and the fifth gear are jointly disposed in the accommodating space, and the fifth gear is associated with the transmission gear.

Wherein the first transmission unit is a decelerating mechanism, the first gear member comprises a first gear, a second gear, and a first center shaft configured as a center axle of both the first gear and the second gear, the second gear member comprises a third gear, a fourth gear, and a second center shaft configured as a center axle of both the third gear and the fourth gear, the first gear is engaged with the worm gear, the third gear is engaged with the second gear, and the fourth gear is engaged with the fifth gear.

Wherein the second mounting portion comprises two opposite wall portions and a connecting wall connecting the two wall portions, each of the respective wall portions is oppositely disposed with a guiding groove extending along a longitudinal direction of the second mounting portion and a through hole, the two guiding grooves and the two through holes are opposite to each other, the rack is disposed in the second mounting portion, a pin shaft is inserted through the rack and the guiding groove to enable the rack to move by taking the guiding groove as a track, the cover member is disposed with a shaft hole for one end of the center shaft of the transmission gear to pass through, and the other end of the center shaft of the transmission gear is disposed in the through hole.

Wherein the rack is provided with a first recess and a second recess at its two ends respectively, a first wheel body is disposed pivotally in the first recess through a first pin, a second wheel body is disposed pivotally in the second recess through a second pin, and the first wheel body and the second wheel body roll along an inner surface of the second mounting portion.

Wherein the linking member is disposed with a first connecting portion at one end and a second connecting portion at the other end, a second pin is inserted through and connects the first connecting portion, the second wheel body, and the rack such that the linking member is pivoted to the rack, and a third pin is inserted through and connects the second connecting portion and a linkage portion of the swing member such that the swing member is pivoted to the linking member.

Wherein the swing member is disposed with a first accommodating portion and a second accommodating portion connected to the linkage portion, the first accommodating portion and the second accommodating portion accommodate the first gear shaft and the second gear shaft respectively, the first gear shaft is disposed with a first meshing portion at an end facing the first side wall, the second gear shaft is disposed with a second meshing portion at an end facing the first side wall, the first side wall is disposed with a concave edge, a second meshed portion for meshing with the second meshing portion is disposed in the concave edge, the second mounting portion has an extension wall, the first meshing portion is meshed with a first meshed portion of the extension wall, the middle gear is disposed with a shaft rod at the center and a third meshing portion at an end, the shaft rod is disposed in the swing member, and the third meshing portion is meshed with a third meshed portion of the linkage portion.

Wherein the first gear shaft is disposed with a non-circular first jointing portion at an end facing the second mounting portion, the second gear shaft is disposed with a non-circular second jointing portion facing the second side wall, the second mounting portion is disposed with a first jointed portion corresponding to the first jointing portion, and the second side wall is disposed with a second jointed portion for mating with the jointing portion of the second gear shaft.

Thus, if the chain guide is subject to an impact while a bicycle is being ridden on a road, the impact force is first transferred to the chain guiding portion, and the chain guiding portion transfers the impact force to the first side wall and the second side wall through the pivot portion, to achieve a first buffering effect to reduce the vibration force; then, the force is transferred by the first side wall and the second side wall to the swing member, the internal gear of the swing member absorbs a part of the impact force to buffer the impact force, the remaining impact force attenuates sequentially through the linking member, the rack, the transmission gear, and the first transmission member, and finally, the worm gear absorbs the remaining weak impact force, thereby preventing the problem of a stuck failure or inaccurate chain guiding function from occurring during a gear shift when the bicycle is subject to an impact or vibration during a ride.

BRIEF DESCRIPTIONS OF THE DRAWINGS

FIG. 1 is a schematic plan view of U.S. Pat. No. 6,648,782 B2, "Actuating Apparatus for A Bicycle Derailleur, with Coupling Connected to the Driven Shaft".

DETAILED DESCRIPTIONS OF THE INVENTION

Figure 1:
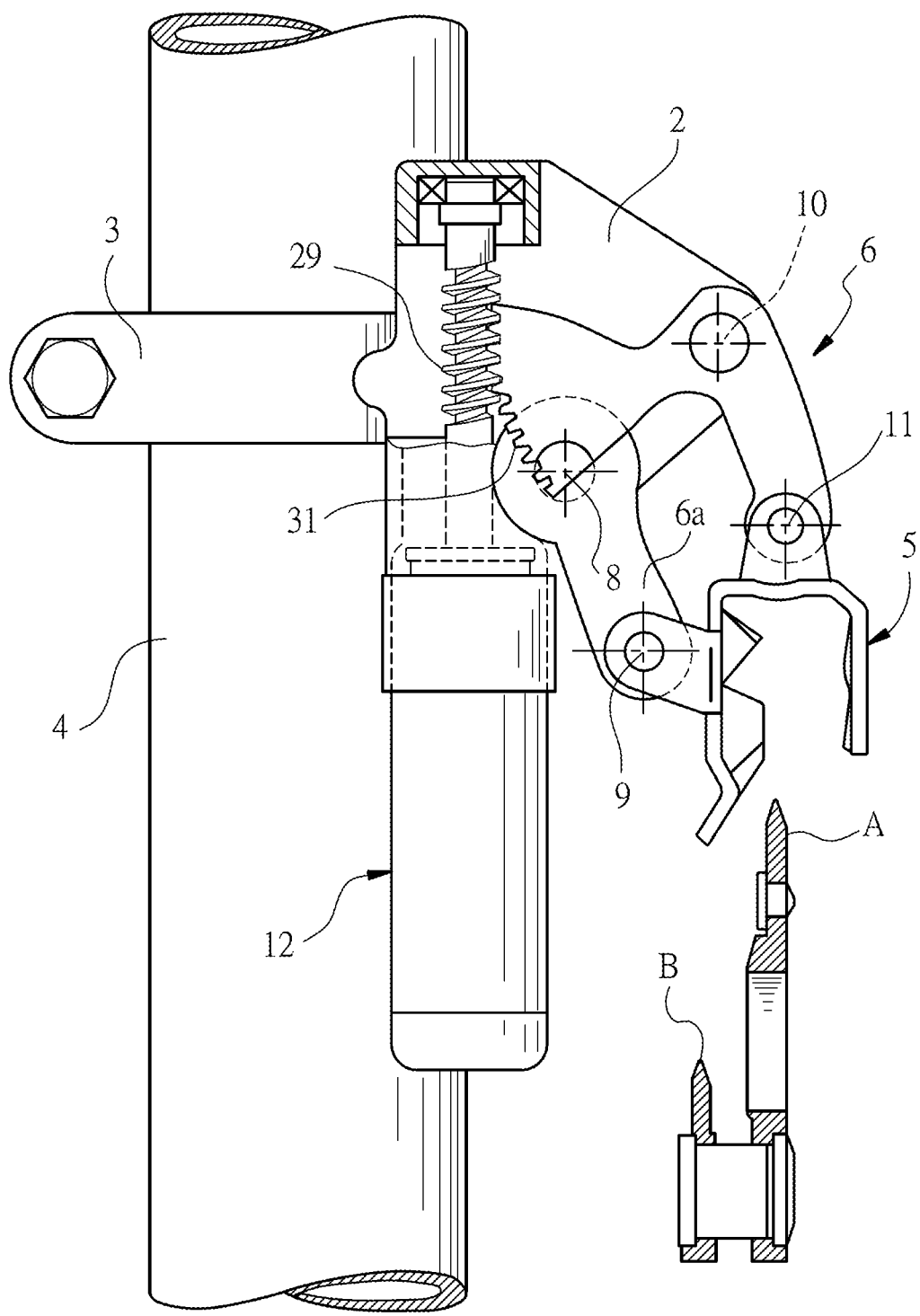

The detailed content and technical illustration of the present disclosure are provided through embodiments, but it should be understood that the embodiments are only intended for exemplary illustration and not to be interpreted as a limit to implementation of the present disclosure.

Referring to FIG. 2 to FIG. 6, an electric front derailleur of the present embodiment comprises a support member 10, a driving unit 20 (an electric motor in the present embodiment), a first transmission unit 30, a second transmission unit 40, and a chain guide 50.

The support member 10 is mounted on a frame a of a bicycle and comprises an upper cover 11, a shell 12 located below the upper cover 11 and disposed along the shape of the upper cover 11, and a second mounting portion 13.

The upper cover 11 partially covers a first mounting portion 34. The second mounting portion 13 has a seat plate 131. The seat plate 131 is disposed with a track portion 132 and a lug 133 disposed at a side of the track portion 132. The track portion 132 is U-shaped in general and comprises two opposite wall portions 132a, 132b and a connecting wall 132c connecting the two wall portions 132a, 132b. The upper cover 11 and the shell 12 fit together to encapsulate the track portion 132 and the lug 133. Each of the wall portions 132a and 132b is disposed with a guiding groove 134 extending in a longitudinal direction of the track portion 132. A through hole 135 is disposed at a side of the guiding groove 134. An upper screw hole 1371 and a lower screw hole 1372 are provided in the wall portion 132a of the track portion 132 close to the shell 12. An extension wall 138 is disposed at a side of the seat plate 131. A first meshed portion 139 is disposed in the extension wall 138.

Figure 2:
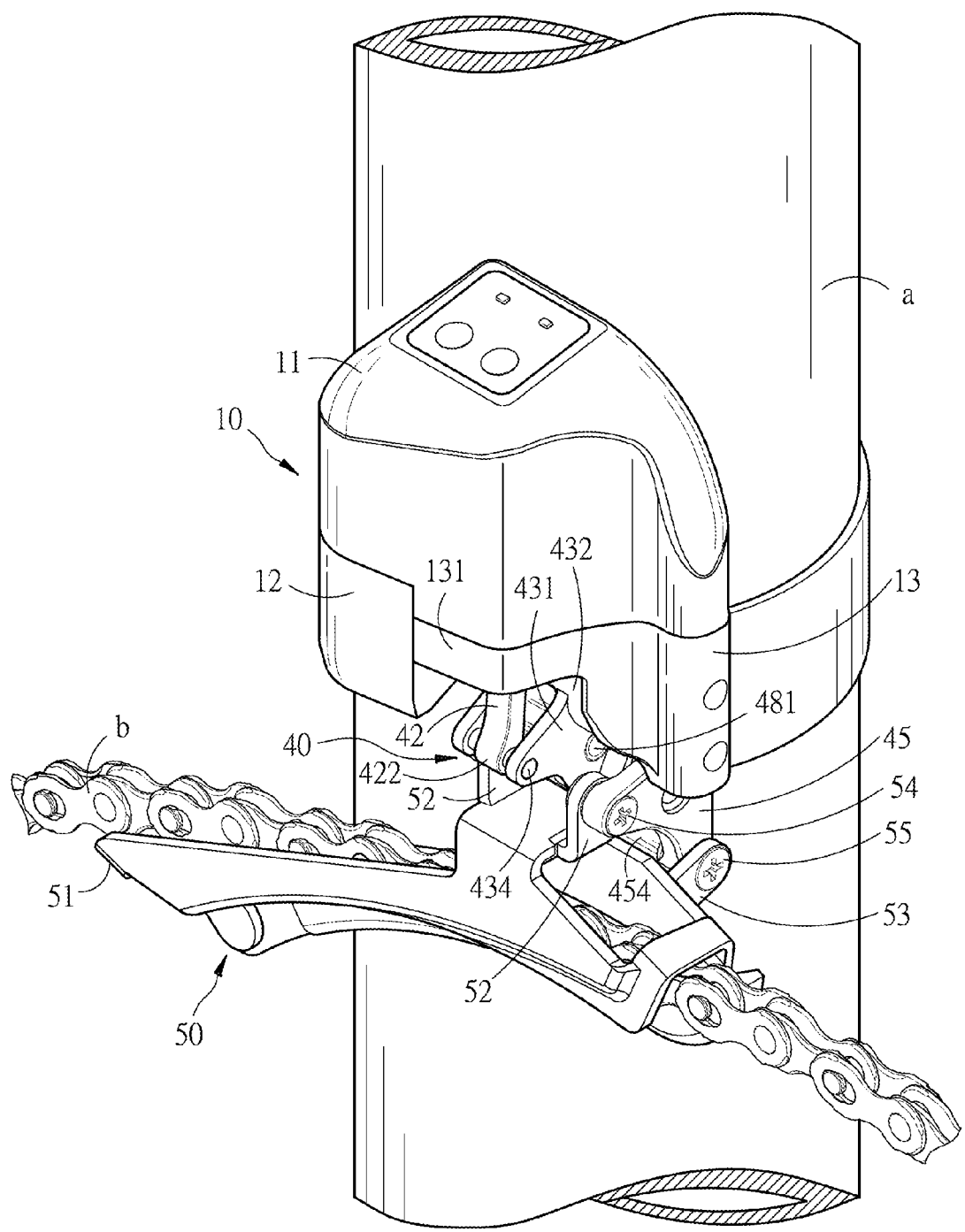
FIG. 2 is a schematic view of a frame assembled in a bicycle according to an embodiment of the present disclosure.

A cavity 121 for accommodating the driving unit 20 is disposed at one side of the shell 12. An open space for fitting the second mounting portion 13 is disposed at the other side of the shell 12. Referring to FIG. 2, a side stop wall 122 is disposed close to the frame of the bicycle. A part of the side stop wall 122 may extend to the upper cover 11. A bearing plate 123 perpendicular to the side stop wall 122 extends from the side stop wall 122 towards the cavity 121. The bearing plate 123 rides on the seat plate 131 of the second mounting portion 13. A partition plate 124 protruding from a side of the side stop wall 122 is disposed in the shell 12 to define the cavity 121 and the open space. A third bolt 127 is inserted through the side stop wall 122 and is then screwed into the lug 133 of the second mounting portion 13.

The driving unit 20 has a rotation shaft 21 and outputs a driving force through the rotation shaft 21. The rotation shaft 21 is further disposed with a worm gear 22 to output the driving force through the worm gear 22.

The first transmission unit 30, driven by the worm gear 22, is a decelerating mechanism formed of gears having different sizes and engaged with each other, and is configured to drive a transmission gear 33 to rotate. The first transmission unit 30 is disposed with a first gear member 31 engaged with the worm gear 22, a second gear member 32 works with the first gear member 31 and are jointly disposed in the first mounting portion 34. When the worm gear 22 leads the first gear member 31 to rotate, the second gear member 32 leads the transmission gear 33 to rotate.

Figure 4:
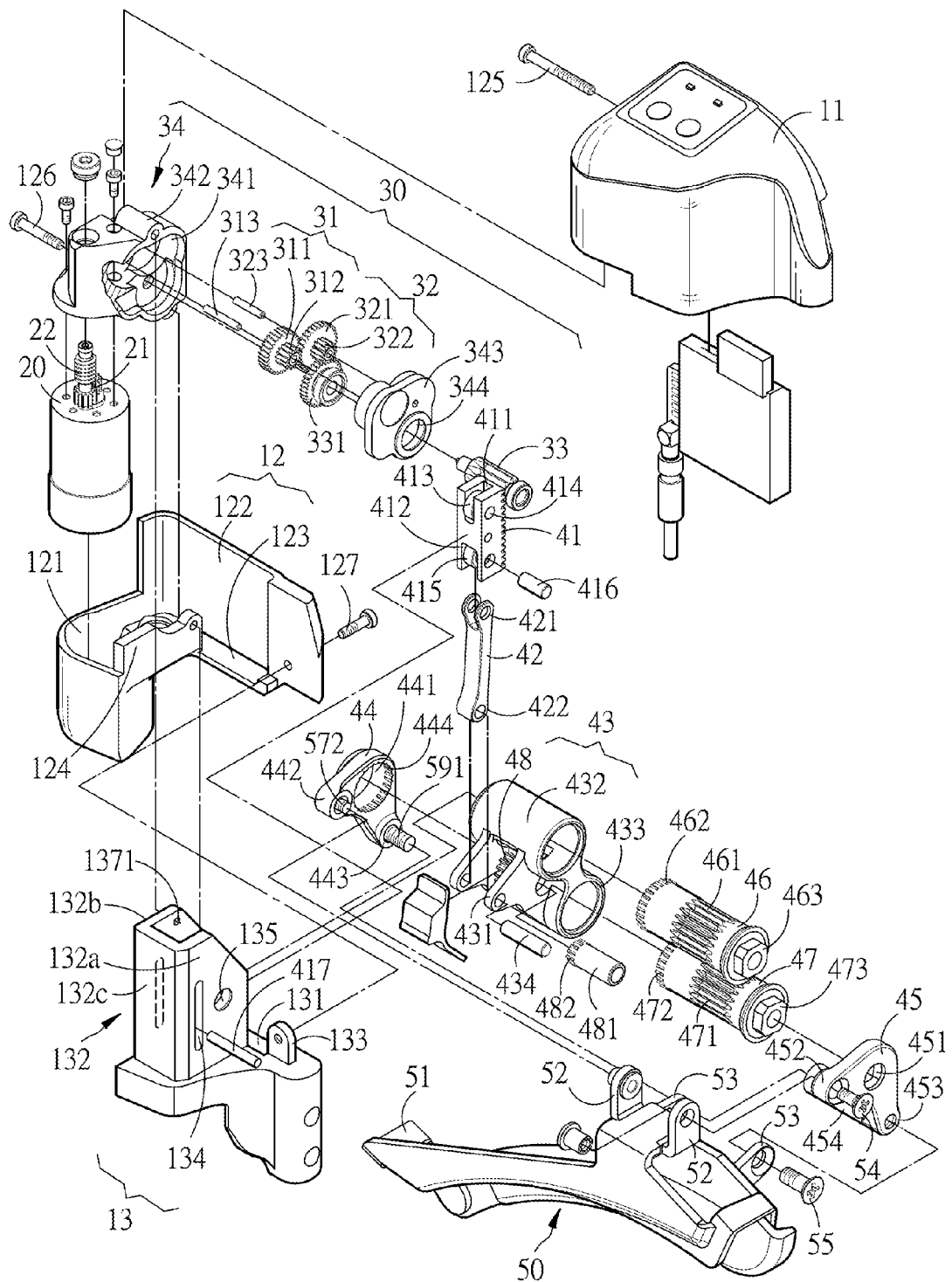
FIG. 4 is a perspective exploded view of the embodiment of the present disclosure.

Referring to FIG. 4, further described here is that the first gear member 31 comprises a first center shaft 313, a first gear 311 for engaging with the worm gear 22, and a second gear 312 disposed at a side of the first gear 311 and having an outer diameter less than that of the first gear 311. The first center shaft 313 is inserted through centers of the first gear 311 and the second gear 312, and thereby leading the first gear 311 and the second gear 312 to rotate together. The second gear member 32 comprises a second center shaft 323 and a third gear 321 having an outer diameter greater than that of the second gear 312. The third gear 321 is engaged with the second gear 312. A fourth gear 322 having an outer diameter less than that of the third gear 321 is disposed at a side of the third gear 321. The second center shaft 323 is inserted through centers of the third gear 321 and the fourth gear 322 and thereby leading the third gear 321 and the fourth gear 322 to rotate together. The fourth gear 322 is engaged with a fifth gear 331 having an outer diameter greater than that of the fourth gear 322. The fifth gear 331 is located at a side of the transmission gear 33 and is associated with the transmission gear 33, in the present disclosure, the fifth gear 331 is coaxial with the transmission gear. The first mounting portion 34 is provided with an accommodating space 341 for accommodating the first gear member 31, the second gear member 32, and the fifth gear 331. The first mounting portion 34 is disposed with a protrusion portion 342 and a cover member 343 for closing an opening of the accommodating space 341. A first bolt 125 is inserted into the upper cover 11 from the outside to the inside and through the protrusion portion 342 of the first mounting portion 34, and is then screwed into the upper screw hole 1371 of the second mounting portion 13, such that the first mounting portion 34 is bonded with the second mounting portion 13. A second bolt 126 is inserted through the bottom of the shell 12 and then through the partition plate 124 and is screwed into the lower screw hole 1372 of the second mounting portion 13.

The cover member 343 is provided with a shaft hole 344 for the transmission gear 33 to pass through. The first gear member 31, the second gear member 32, and the fifth gear 331 are disposed in the accommodating space 341 of the first mounting portion 34. Two ends of each of the first center shaft 313 and the second center shaft 323 are pivotally disposed in the first mounting portion 34 and the cover member 343 respectively. One end of the center shaft of the transmission gear 33 is bonded with and rotates with the fifth gear 331. The transmission gear 33 is inserted through the wall portion 132b of the track portion 132 and is located in an internal space of the track portion 132. The other end of the center shaft of the transmission gear 33 is pivotally disposed in the through hole 135 in the wall portion 132a.

The second transmission unit 40 comprises a rack 41 engaged with the transmission gear 33, a linking member 42 pivoted to a lower end of the rack 41 and inserted through the second mounting portion 13, a swing member 43 pivoted to the linking member 42, a first side wall 44, and a second side wall 45. In the present embodiment, the rack 41 is disposed in the track portion 132 of the second mounting portion 13. The rack 41 is provided with a first recess 411 and a second recess 412 at its two ends respectively. A first wheel body 413 is disposed pivotally in the first recess 411 through a first pin 414. A second wheel body 415 is disposed pivotally in the second recess 412 through a second pin 416. The first wheel body 413 and the second wheel body 415 roll along an inner surface of the connecting wall 132c of the track portion 132. A pin shaft 417 is inserted through the middle of the rack 41. The two ends of the pin shaft 417 are pivotally disposed in the two guiding grooves 134 of the track portion 132 respectively.

One end of the linking member 42 is a first connecting portion 421, and the other end of the linking member 42 is a second connecting portion 422. The second pin 416 is inserted through and connects the first connecting portion 421, the second wheel body 415, and the rack 41, such that the linking member 42 is pivoted to the rack 41. The swing member 43 is disposed with two opposite linkage portions 431, a first accommodating portion 432, and a second accommodating portion 433, wherein the first accommodating portion 432 and the second accommodating portion 433 are connected to the two linkage portions respectively. A third pin 434 is inserted through and connects the second connecting portion 422 of the linking member 42 and the two linkage portions 431, such that the swing member 43 is pivoted to the linking member 42. The swing member 43 is disposed with a middle gear 48. Two opposite sides of the second accommodating portion 433 are fit with the first side wall 44 and the second side wall 45 respectively. The linkage portion 431 close to the first side wall 44 is disposed with a third meshed portion 435.

Figure 5A:
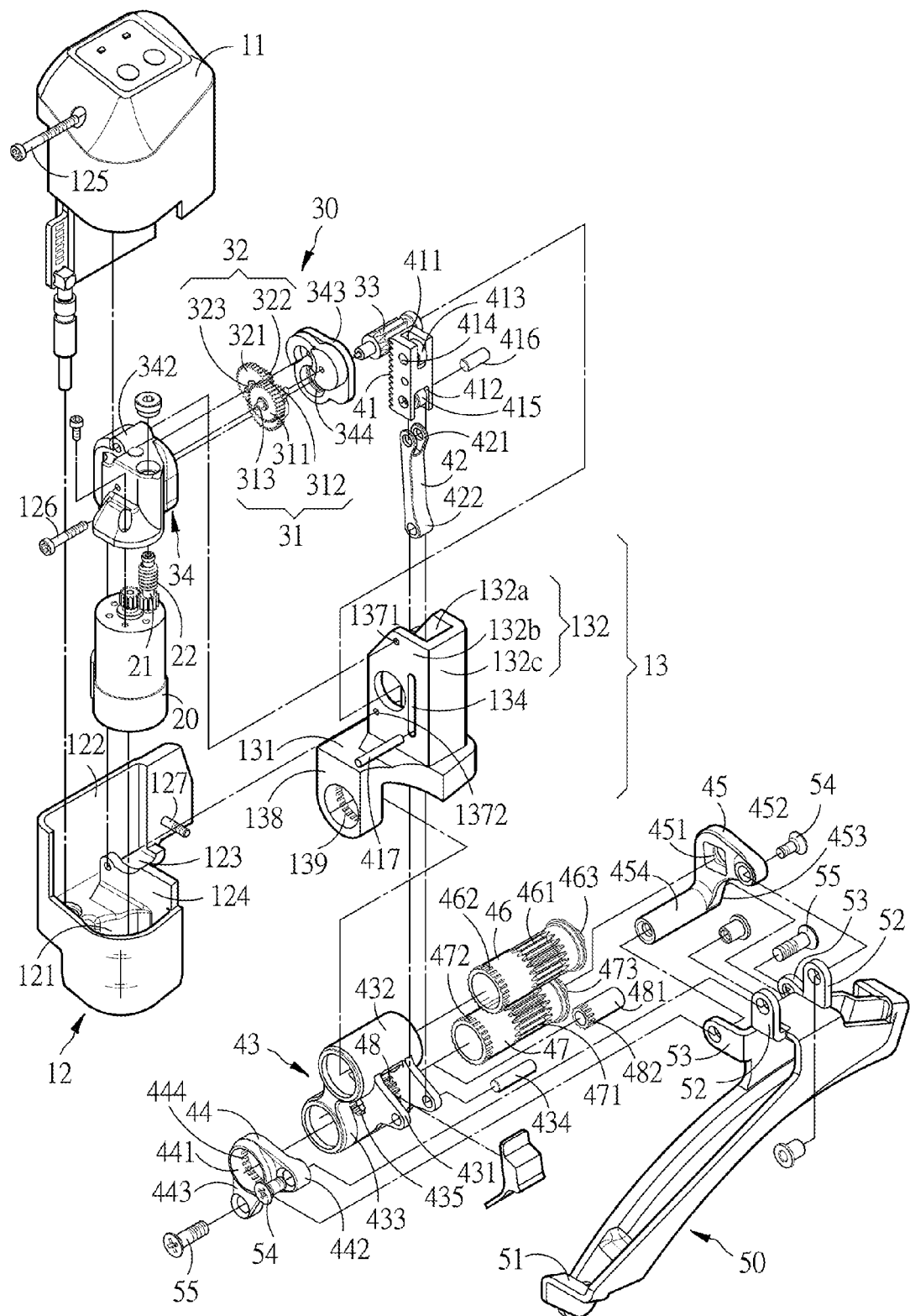
FIG. 5A is a perspective exploded view of the embodiment of the present disclosure in another direction.

Referring to FIG. 4 and FIG. 5A, a first gear shaft 46 is mounted inside the first accommodating portion 432. A peripheral wall of the first gear shaft 46 facing the first side wall 44 is disposed with a first meshing portion 462 for meshing with the first meshed portion 139 of the second mounting portion 13. A second gear shaft 47 is mounted inside the second accommodating portion 433. A peripheral wall of the second gear shaft 47 facing the first side wall 44 is disposed with a second meshing portion 472. The other end of the second gear shaft 47 is fit with and connected to the second side wall 45.

Figure 5B:
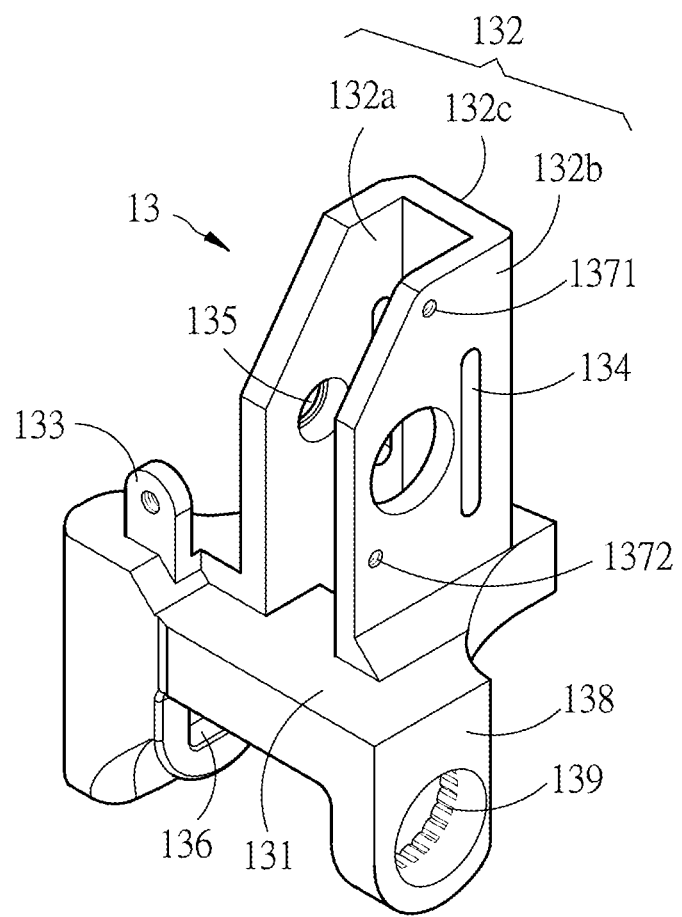
FIG. 5B is an enlarged view of a second mounting portion in FIG. 5A in another direction.

The connection relation of the first gear shaft 46 and the second gear shaft 47 is further described as follows. Referring to FIG. 4, FIG. 5A, and FIG. 5B, a non-circular first jointing portion 463 and a non-circular second jointing portion 473 protrude from ends of the first gear shaft 46 and the second gear shaft 47 facing the second side wall 45 respectively. The first jointing portion 463 is jointed to a first jointed portion 136 disposed with a corresponding shape according of the first jointing portion 463 on the second mounting portion 13. The second side wall 45 is disposed with a second jointed portion 451 disposed corresponding to the shape of the second jointing portion 473 and jointed to the second jointing portion 473. The second side wall 45 is disposed with a first jointing end 452 and a second jointing end 453. The second jointing end 453 is disposed with a tubular connecting portion 454 extending in a direction towards the first side wall 44. The first side wall 44 is disposed with a concave edge 441 for nesting the second gear shaft 47. The concave edge 441 is disposed with a second meshed portion 444 for meshing with the second meshing portion 472. The first side wall 44 is disposed with a third jointing end 442 and a fourth jointing end 443. A shaft rod 481 is disposed at the center of the middle gear 48. A third meshing portion 482 is disposed at one end of the shaft rod 481 close to the first side wall 44. The third meshing portion 482 is meshed with the third meshed portion 435 of the linkage portion 431. As shown in FIG. 5, the other end of the shaft rod 481 is pivotally disposed on the other linkage portion 431 close to the second side wall 45.

The chain guide 50 has a chain guiding portion 51 capable of selectively guiding a chain b, a first pivot portion 52, and a second pivot portion 53. The first pivot portion 52 is pivoted to the third jointing end 442 of the first side wall 44 and the first jointing end 452 of the second side wall 45 through a first pivot member 54. The second pivot portion 53 is pivoted to the fourth jointing end 443 of the first side wall 44 and the second jointing end 453 of the second side wall 45 through a second pivot member 55.

Figure 3:
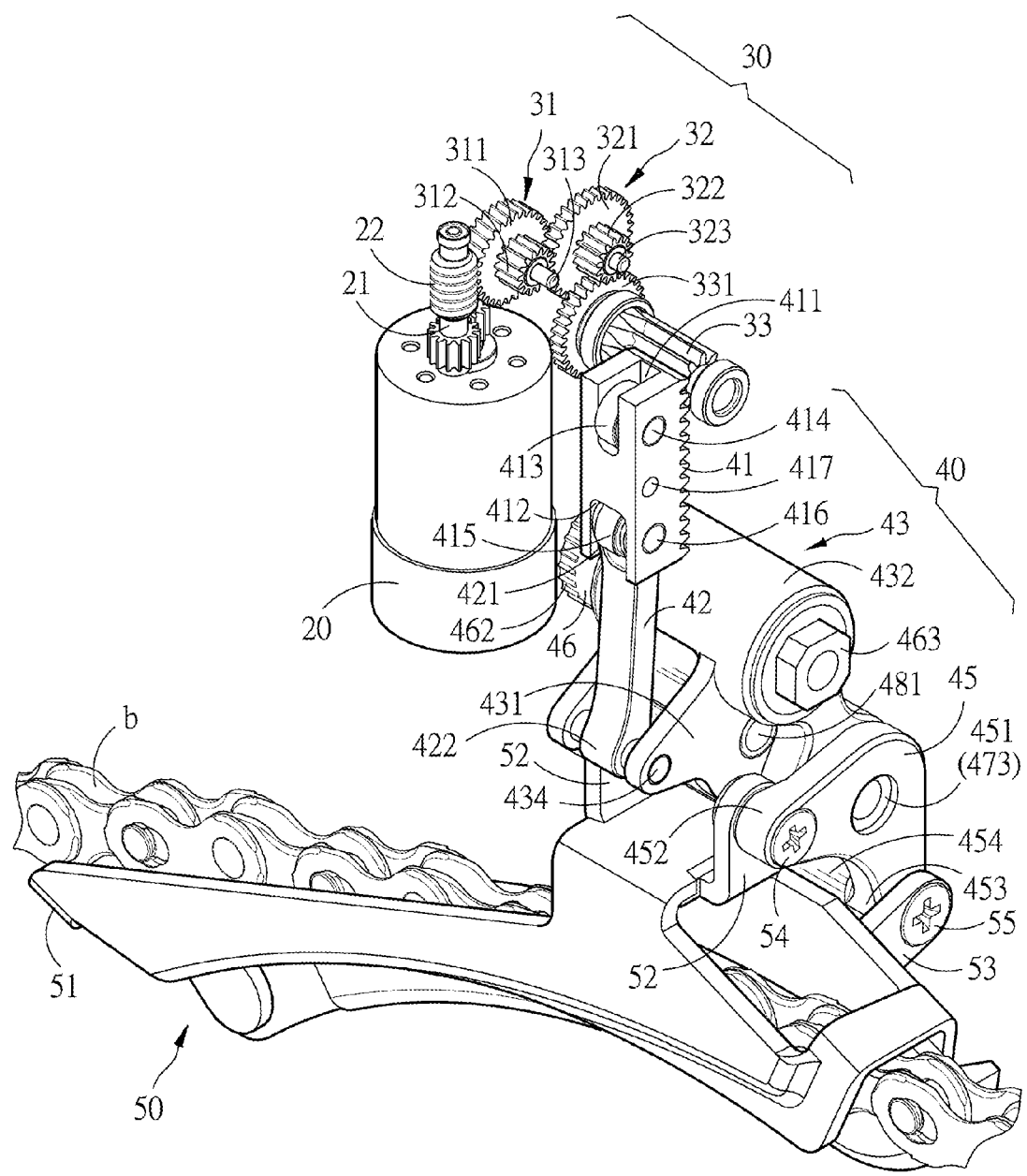
FIG. 3 is an assembled perspective view of the embodiment of the present disclosure without a support member.
Figure 6:
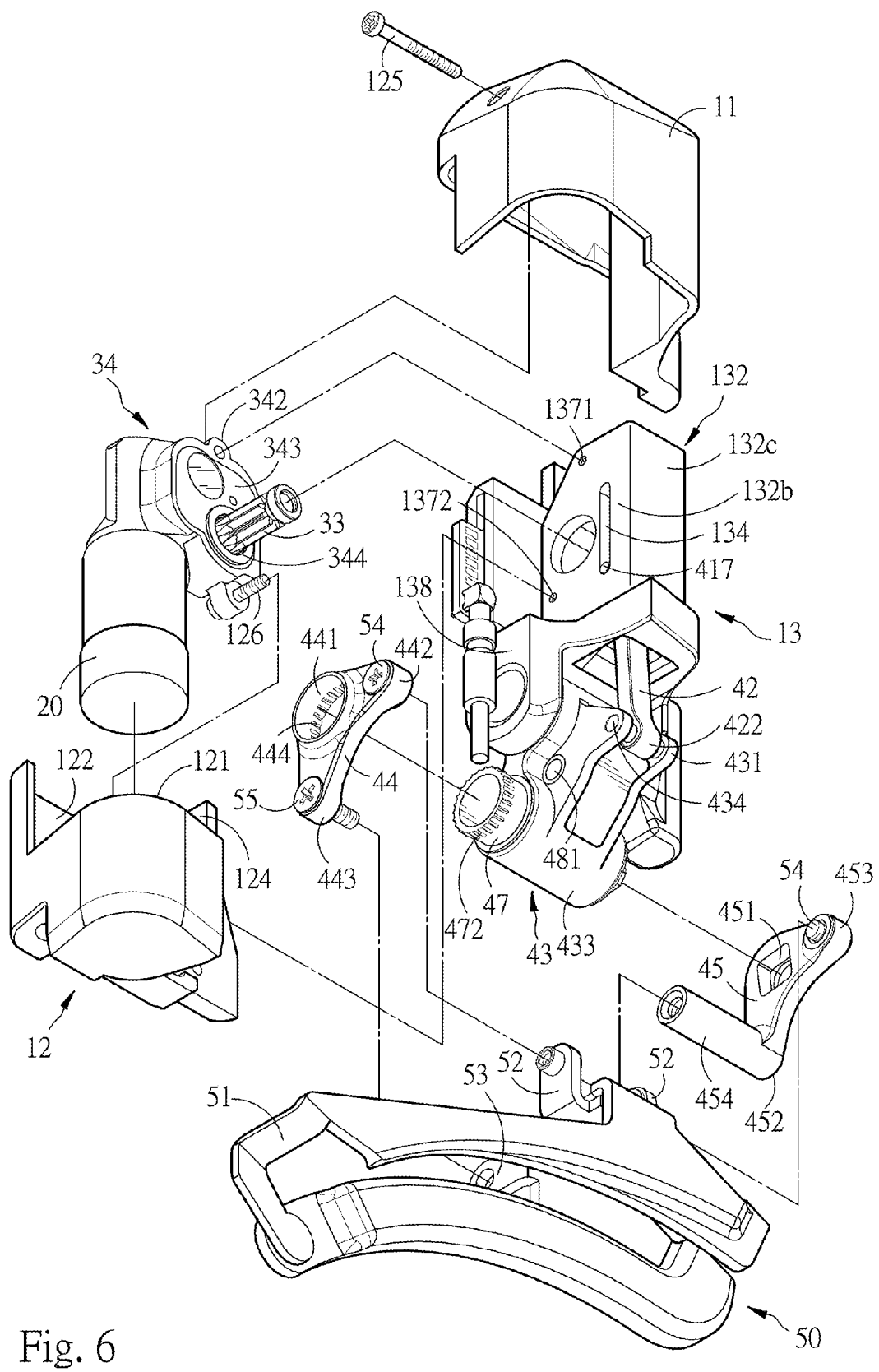
FIG. 6 is a partial exploded view of the embodiment of the present disclosure.
Figure 7A:
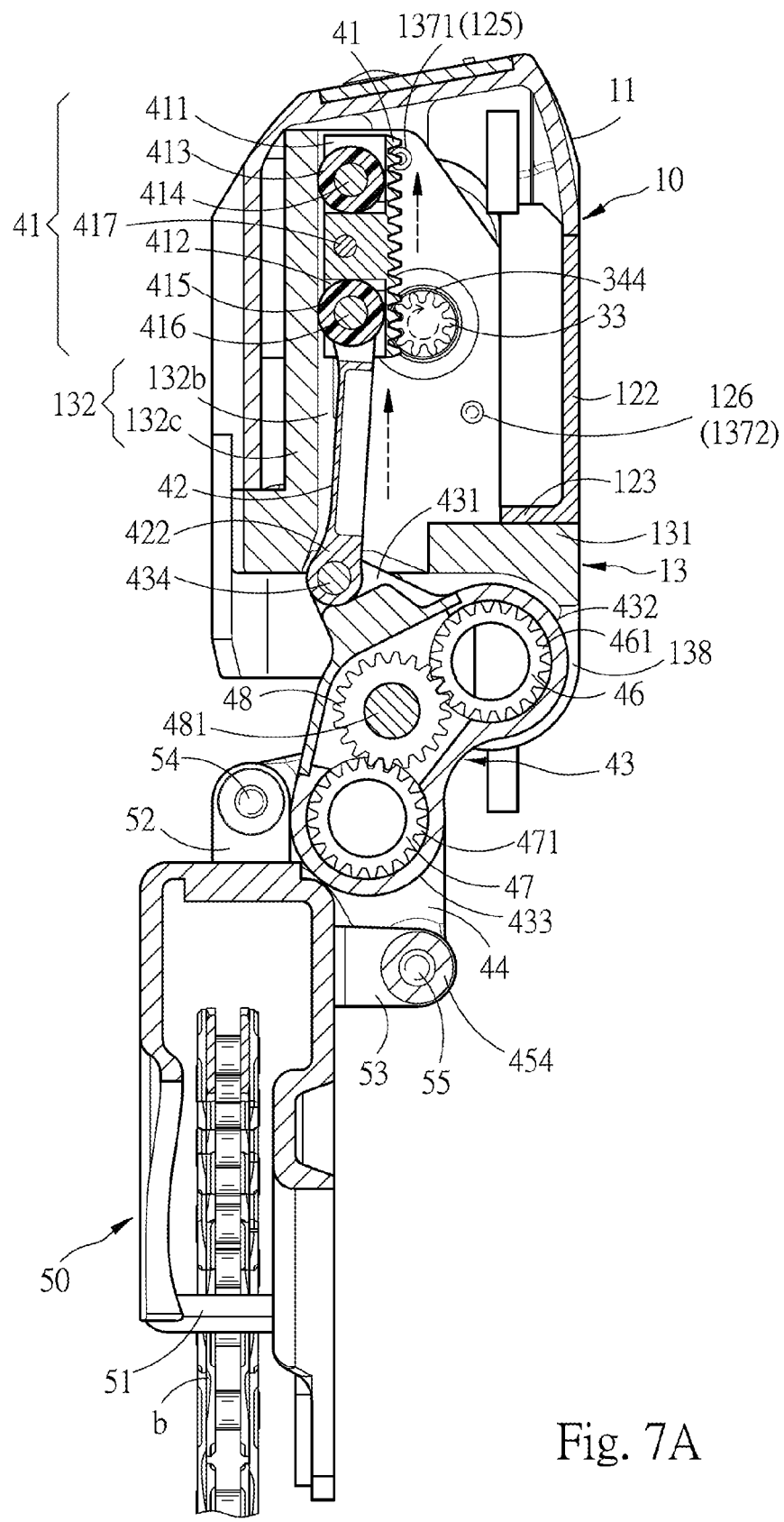
FIG. 7A is a first action schematic view of the embodiment of the present disclosure.

Referring to FIG. 3, FIG. 6, and FIG. 7A, when the driving unit 20 drives the rotation shaft 21 to rotate, the worm gear 22 can be led to rotate. The worm gear 22 is engaged with the first gear 311 to lead the second gear 312 to rotate. The second gear 312 is engaged with the third gear 321 to lead the fourth gear 322 to rotate. The fourth gear 322 is engaged with the fifth gear 331, to drive the fifth gear 331 to rotate and thus lead the transmission gear 33 coaxial with the fifth gear 331 to rotate. The transmission gear 33 is engaged with the rack 41 and can lead the rack 41 to shift up and down. With the shifting of the rack 41, the pin shaft 417 pivoted to the two guiding grooves 134 can shift up and down along the guiding grooves 134.

The second pin 416 is inserted through and pivotally connects the first connecting portion 421 at the upper end of the linking member 42 and the lower end of the rack 41, such that the up-and-down movement of the rack 41 leads the linking member 42 to rise up and fall down. The third pin 434 is inserted through and connects the two linkage portions 431 and the second connecting portion 422 of the linking member 42, such that the swing member 43 is pivoted to the linking member 42 and moves up and down with the linking member 42.

Additionally, the first meshing portion 462 of the first gear shaft 46 is meshed with the first meshed portion 139 of the second mounting portion 13. When the swing member 43 is lifted upwards, the middle gear 48 can be led to be engaged with the first teeth 461 of the first gear shaft 46 and driven to rotate. The middle gear 48 is engaged with the second teeth 471 of the second gear shaft 47, to drive the second gear shaft 47 to rotate. Since the second gear shaft 47 in the second accommodating portion 433 is jointed to the jointed portion 451 of the second side wall 45 through the non-circular jointing portion 473 at one end to lead the second side wall 45 to swing, the first pivot portion 52 of the chain guide 50 is pivoted to the third jointing end 442 of the first side wall 44 and the first jointing end 452 of the second side wall 45 respectively, and the second pivot portion 53 is pivoted to the fourth jointing end 443 of the first side wall 44 and the second jointing end 453 of the second side wall 45 respectively, the chain guide 50 moves with the swing member 43.

Referring to FIG. 7A, when the transmission gear 33 rotates clockwise to drive the rack 41 to move upwards, the linkage portion 431 of the swing member 43 is pulled and lifted upwards. The first meshing portion 462 of the first gear shaft 46 is meshed with the first meshed portion 139 of the second mounting portion 13 to serve as a center shaft for pivotal rotation of the swing member 43. The second accommodating portion 433 moves away from the frame a of the bicycle. The second gear shaft 47 fit in the second accommodating portion 433 and the first side wall 44 and the second side wall 45 fit with the second gear shaft 47 move together away from the frame a of the bicycle, such that the chain guide 50 pivoted onto the first side wall 44 and the second side wall 45 contacts and guides the chain b such that the chain b moves away from the frame a of the bicycle and is shifted onto a target sprocket wheel (not shown).

Figure 7B:
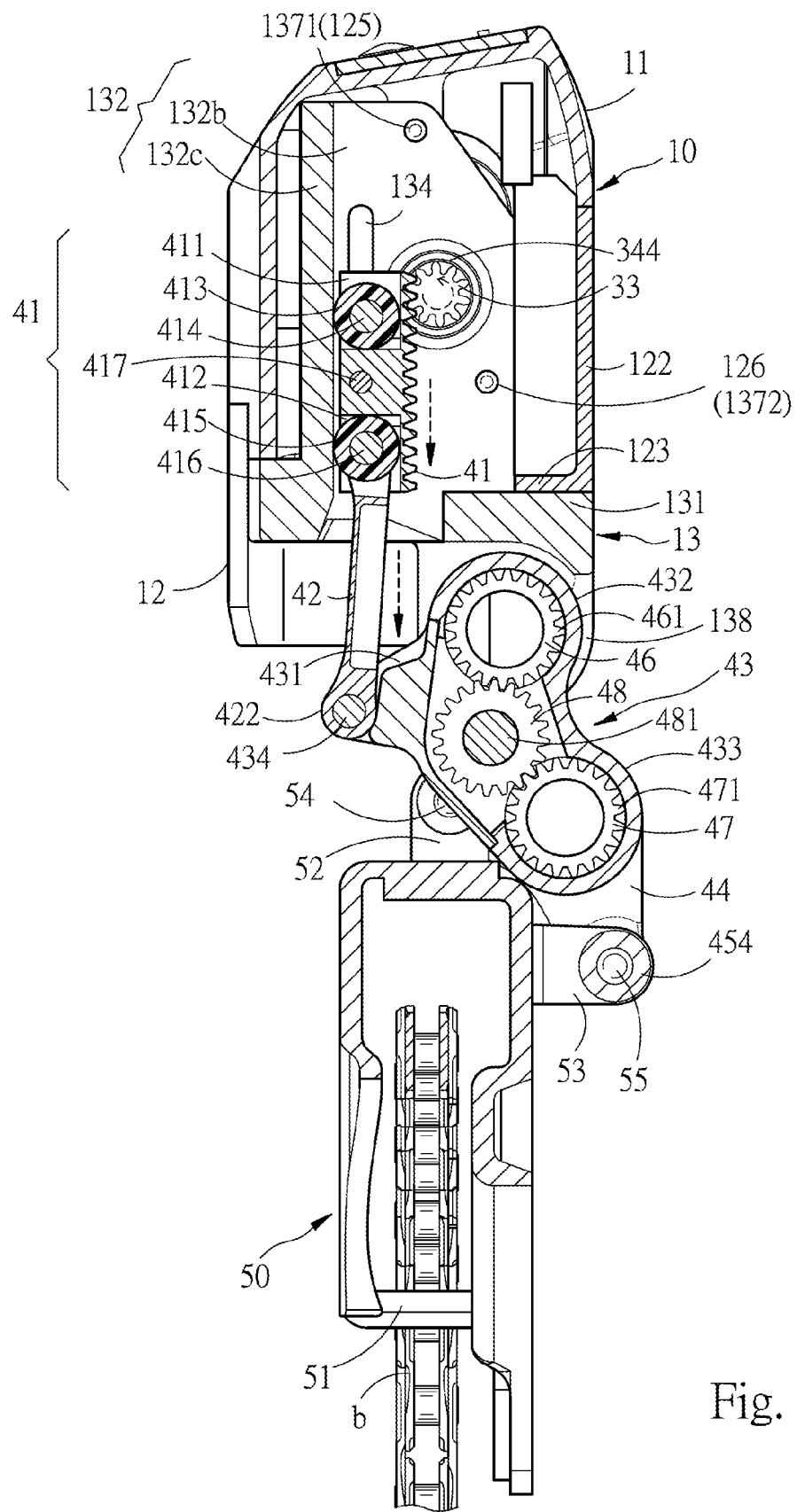
FIG. 7B is a second action schematic view of the embodiment of the present disclosure.

On the contrary, referring to FIG. 7B, when the transmission gear 33 rotates counterclockwise to drive the rack 41 to move downwards, the linkage portion 431 of the swing member 43 is pulled and moved downwards. The second accommodating portion 433 moves towards the frame a of the bicycle. The second gear shaft 47 fit in the second accommodating portion 433 and the first side wall 44 and the second side wall 45 fit with the second gear shaft 47 move together towards the frame a of the bicycle, such that the chain guide 50 pivoted onto the first side wall 44 and the second side wall 45 contacts and guides the chain b such that the chain b moves close to the frame a of the bicycle and is shifted onto another target sprocket wheel (not shown).

The present disclosure at least has the following advantages:

During a bicycle ride on an uneven road, it is difficult for the chain guide 50 to avoid impacts. When the chain guide 50 is subject to an impact force, the impact force is transferred to the swing member 43, and the swing member 43 absorbs a part of the impact force to buffer and reduce the impact force. Then, the reduced impact force is transferred from the swing member 43 to the rack 41 through the linking member 42, and then to the transmission gear 33 through the rack 41. The first transmission unit 30 further reduces the impact force and finally transfers the remaining force to the worm gear 22. The worm gear 22 absorbs the remaining force. Because the force is transferred by the plurality of mechanisms, the force has reduced to an extent that it does not damage the worm gear 22, and it can be directly absorbed by the worm gear 22 without influencing the driving unit 20 or even damaging the internal elements, thereby preventing the problem of a stuck failure or inaccurate chain guiding function from occurring during a gear shift when the bicycle is subject to an impact or vibration during a ride.

The present disclosure has been disclosed above with preferred embodiments. However, it should be understood by those skilled in the art that, the embodiments are only intended to describe the present disclosure, and not to limit the scope of the present disclosure. It should be noted that, all equivalent changes and replacements of the embodiments fall within the scope of the present disclosure. Therefore, the scope of the disclosure is defined by the following claims.

What is claimed is:

1. An electric front derailleur, comprising:
   a support member, disposed on a frame of a bicycle and having a first mounting portion and a second mounting portion;

a driving unit, disposed in the first mounting portion and configured to drive a worm gear to rotate;

a first transmission unit, having at least one transmission gear that is driven by the worm gear;

a second transmission unit, comprising a rack, a linking member, and a swing member, wherein the rack is engaged with the transmission gear and movably disposed in the second mounting portion, and the linking member has one end pivoted to the rack and the other end pivoted to the swing member;

a chain guide, comprising a pivot portion, and a chain guiding portion, wherein the pivot portion is pivoted to the swing member, and the chain guiding portion is configured to move a chain.

2. The electric front derailleur of claim 1, wherein the first transmission unit is disposed in an accommodating space of the first mounting portion, and an opening of the accommodating space is closed by a cover member.

3. The electric front derailleur of claim 2, wherein the swing member has a first gear shaft, a second gear shaft, a middle gear, a first side wall, and a second side wall, wherein the first gear shaft is fixedly disposed in the support member and the body of the first gear shaft is disposed with a plurality of first teeth for engaging with the middle gear, the first side wall is disposed with a third jointing end and a fourth jointing end, the second side wall is disposed with a first jointing end and a second jointing end, the second jointing end is disposed with a connecting portion connected to the fourth jointing end of the first side wall, and the second gear shaft has two ends fixedly disposed in the first side wall and the second side wall respectively and the body of the second gear shaft is disposed with a plurality of second teeth for engaging with the middle gear.

4. The electric front derailleur of claim 3, wherein the first transmission unit further comprising a first gear member, a second gear member, and a fifth gear, wherein the first gear member is engaged with the worm gear and works with the second gear member, the second gear member works with the fifth gear, the first gear member, the second gear member, and the fifth gear are jointly disposed in the accommodating space, and the fifth gear is associated with the transmission gear.

5. The electric front derailleur of claim 4, wherein the first transmission unit is a decelerating mechanism, the first gear member comprises a first gear, a second gear, and a first center shaft configured as a center axle of both the first gear and the second gear, the second gear member comprises a third gear, a fourth gear, and a second center shaft configured as a center axle of both the third gear and the fourth gear, the first gear is engaged with the worm gear, the third gear is engaged with the second gear, and the fourth gear is engaged with the fifth gear.

6. The electric front derailleur of claim 3, wherein the second mounting portion comprises two opposite wall portions and a connecting wall connecting the two wall portions, each of the wall portions is disposed with a guiding groove and a through hole, the two guiding grooves and the two through holes are opposite to each other, the rack is disposed in the second mounting portion, a pin shaft is inserted through the rack and the guiding groove to enable the rack to move by taking the guiding groove as a track, the cover member is disposed with a shaft hole for one end of the center shaft of the transmission gear to pass through, and the other end of the center shaft of the transmission gear is disposed in the through hole.

7. The electric front derailleur of claim 6, wherein the rack is provided with a first recess and a second recess at its two ends respectively, a first wheel body is disposed pivotally in the first recess through a first pin, a second wheel body is disposed pivotally in the second recess through a second pin, the first wheel body and the second wheel body roll along an inner surface of the second mounting portion.

8. The electric front derailleur of claim 7, wherein the linking member is disposed with a first connecting portion at one end and a second connecting portion at the other end, the second pin is inserted through and connects the first connecting portion, the second wheel body, and the rack such that the linking member is pivoted to the rack, and a third pin is inserted through and connects the second connecting portion and a linkage portion of the swing member such that the swing member is pivoted to the linking member.

9. The electric front derailleur of claim 8, wherein the swing member is disposed with a first accommodating portion and a second accommodating portion connected to the linkage portion, the first accommodating portion and the second accommodating portion accommodate the first gear shaft and the second gear shaft respectively, the first gear shaft is disposed with a first meshing portion at an end facing the first side wall, the second gear shaft is disposed with a second meshing portion at an end facing the first side wall, the first side wall is disposed with a concave edge, a second meshed portion for meshing with the second meshing portion is disposed in the concave edge, the second mounting portion has an extension wall, the first meshing portion is meshed with a first meshed portion of the extension wall, the middle gear is disposed with a shaft rod at the center and a third meshing portion is disposed at an end of the shaft rod, the shaft rod is disposed in the swing member, and the third meshing portion is meshed with a third meshed portion of the linkage portion.

10. The electric front derailleur of claim 9, wherein the first gear shaft is disposed with a non-circular first jointing portion at an end facing the second mounting portion, the second gear shaft is disposed with a non-circular second jointing portion in a direction facing the second side wall, the second mounting portion is disposed with a first jointed portion corresponding to the first jointing portion, and the second side wall is disposed with a second jointed portion for mating with the jointing portion of the second gear shaft.

\* \* \* \* \*